(12) United States Patent
Caronni et al.

(10) Patent No.: US 7,657,543 B1
(45) Date of Patent: Feb. 2, 2010

(54) METHOD AND SYSTEM FOR CREATING AND USING SHADOW ROOTS

(75) Inventors: Germano Caronni, Menlo Park, CA (US); Raphael J. Rom, Palo Alto, CA (US); Glenn C. Scott, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 512 days.

(21) Appl. No.: 11/045,961

(22) Filed: Jan. 28, 2005

Related U.S. Application Data (60) Provisional application No. 60/617,912, filed on Oct. 12, 2004.

(51) Int. Cl.
G06F 17/30 (2006.01)
(52) U.S. Cl. .................. 707/100; 715/259; 715/260; 706/45; 706/46; 706/60; 706/61
(58) Field of Classification Search .............. None
See application file for complete search history.

(56) References Cited

U.S. PATENT DOCUMENTS

| | | | |
|---|---|---|---|
| 5,640,564 A * | 6/1997 | Hamilton et al. ............ 719/315 |
| 5,761,511 A * | 6/1998 | Gibbons et al. ............ 717/122 |
| 5,907,837 A | 5/1999 | Ferrel et al. | |
| 6,629,203 B1 * | 9/2003 | Humlicek ................. 711/114 |
| 2002/0133491 A1 * | 9/2002 | Sim et al. ................. 707/10 |
| 2002/0174275 A1 * | 11/2002 | Jay et al. .................. 710/104 |
| 2003/0055805 A1 | 3/2003 | Gardner | |
| 2005/0015775 A1 | 1/2005 | Russell et al. | |
| 2005/0165724 A1 | 7/2005 | West | |
| 2005/0262097 A1 | 11/2005 | Sim-Tang et al. | |
| 2006/0168154 A1 * | 7/2006 | Zhang et al. ................ 709/220 |
| 2006/0179037 A1 * | 8/2006 | Turner et al. .................. 707/3 |
| 2007/0094312 A1 | 4/2007 | Sim-Tang | |

OTHER PUBLICATIONS

John Kubiatowics, OceanStore: An Architecture for Global-Scale Persistent Storage, 2000, University of California, Berkeley, 12pages.*

A. Adya, et al.; "Farsite: Federated, Available, and Reliable Storage for an Incompletely Trusted Environment"; Proceedings of the 5th Symposium on Operating Systems and Design Implementation OSDI; Dec. 2002 (14 pages).

I. Clarke, et al.; "Freenet: A Distributed Anonymous Information Storage and Retrieval System"; Lecture Notes in Computer Science; 2000 (21 pages).

(Continued)

Primary Examiner—Jean M Corrielus
Assistant Examiner—Noosha Arjomandi
(74) Attorney, Agent, or Firm—Osha • Liang LLP (57) ABSTRACT

A method for storing a first copy of an object, including obtaining the object including a globally unique identifier (GUID), generating a first derived GUID using the GUID of the object, storing the first copy of the object identified by the first derived GUID in a root node of the object, publishing possession of the first copy of the object identified by the first derived GUID by the root node of the object, associating a first shadow root with the first copy of the object, and storing the first copy of the object identified by the GUID in the first shadow root.

25 Claims, 6 Drawing Sheets

OTHER PUBLICATIONS

J. Kubiatowicz, et al.; "OceanStore: An Architecture for Global-Scale Persistent Storage"; Proceedings of ACM ASPLOS; Nov. 2000 (12 pages).

A. Rowstron, et al.; "Storage Management and Caching in PAST, a Large-Scale, Peristent Peer-to-Peer Storage Utility"; Symposium on Operating System Principles; Oct. 2001 (13 pages).

S. Quinlan, et al.; "Venti: A New Approach to Archival Storage"; Proceedings of the FAST 2002 Conference on File and Storage Technologies; First USENIX Conference on File and Storage Technologies; Jan. 2002 (14 pages).

A. Muthitacharoen, et al.; "Ivy: A Read/Write Peer-to-Peer File System"; Proceedings of the $5^{th}$ USENIX Symposium on Operating Systems Design and Implementation (OSDI '02); Dec. 2002 (23 pages).

F. Dabek, et al.; "Towards a Common API for Structured Peer-to-Peer Overlays"; Proceedings of $2^{nd}$ International Workshop on Peer-to-Peer Systems (IPTPS '03), Feb. 2003 (11 pages).

I. Stoica, et al.; "Chord: A Scalable Peer-to-Peer Lookup Service for Internet Applications"; Proceedings of the SIGCOMM 2001 Conference on Applications, Technologies, Architectures, and Protocols for Computer Communications; Aug. 2001 (12 pages).

B. Zhao, et al.; "Tapestry: A Resilient Global-Scale Overlay for Service Deployment"; IEEE Journal on Selected Areas in Communications; Jan. 2004 (15 pages).

A. Rowstron, et al.; "Pastry: Scalable, Decentralized Object Location and Routing for Large-Scale Peer-to-Peer Systems"; Lecture Notes in Computer Science; 2001 (22 pages).

C. Greg Plaxton, et al.; "Accessing Nearby Copies of Replicated Objects in a Distributed Environment"; ACM Symposium on Parallel Algorithms and Architectures; Jun. 1997 (23 pages).

M. Castro, et al.; "Practical Byzantine Fault Tolerance"; Symposium on Operating Systems Design and Implementation; Feb. 1999 (14 pages).

D. B. Terry, et at.; "Managing Update Conflicts in Bayou, a Weakly Connected Replicated Storage System"; Proceedings of the Fifteenth ACM Symposium on Operating Systems Principles; Dec. 1995 (12 pages).

D. Boneh, et al.; "Efficient Generation of Shared RSA Keys"; Journal of the ACM; 2001 (21 pages).

Y. Frankel, et al.; "Robust Efficient Distributed RSA-Key Generation"; Proc. $30^{th}$ Annual ACM Symposium on Theory of Computing (STOC); May 1998 (10 pages).

* cited by examiner

METHOD AND SYSTEM FOR CREATING AND USING SHADOW ROOTS

CROSS-REFERENCE TO RELATED APPLICATIONS

This application claims benefit under 35 U.S.C. § 119(e) from Provisional Application No. 60/617,912 entitled "Maintaining Object Ordering in a Shared P2P Storage Environment" filed on Oct. 12, 2004.

BACKGROUND

In recent years, a number of distributed storage system have been developed, commonly in the context of peer-to-peer (P2P) systems. The first generation of such P2P systems, e.g., Napster, Gnutella, etc., are all 'read-only' systems suitable for file sharing, that place less emphasis on availability and reliability of data and more emphasis on connectivity and name management (i.e., directory, search mechanisms, etc.).

Modern P2P storage systems have evolved to provide solutions to a variety of storage problems. For example, recent approaches to storage systems provide more extensive security, sharing, and archival capability. P2P storage systems typically store data in the form of objects. A particular problem typically encountered by P2P storage systems is the storage and retrieval of back-up copies of important objects (i.e., objects that contain critical data that must be available at all times, despite any connectivity issues or node failures). Conventionally, in order to address the issue of storing back-up copies of important objects, modern P2P storage systems employ some dedicated control (i.e., a deliberate process or service, such as a central entity) that is responsible for ensuring that important objects are replicated and multiple copies are stored on different nodes or elements in the P2P storage system. Thus, the dedicated control is responsible for ensuring that critical data stored in important objects is kept 'alive' (i.e., available at all times) in the P2P storage system. Typically, the dedicated control periodically checks the existence of the replicas of important objects. In some cases, if the dedicated control fails or is otherwise unable to function, the availability of critical data may be compromised.

SUMMARY

In general, in one aspect, the invention relates to a method for storing a first copy of an object, comprising obtaining the object comprising a globally unique identifier (GUID), generating a first derived GUID using the GUID of the object, storing the first copy of the object identified by the first derived GUID in a root node of the object, publishing possession of the first copy of the object identified by the first derived GUID by the root node of the object, associating a first shadow root with the first copy of the object, and storing the first copy of the object identified by the GUID in the first shadow root.

In general, in one aspect, the invention relates to a system, comprising a node configured to publish possession of an object, wherein the object comprises a globally unique identifier (GUID), a root node associated with the object, configured to generate a first derived GUID using the GUID, storing a first copy of the object identified by the first derived GUID, and publish possession of the first copy of the object using the first derived GUID, and a first shadow root configured to store the first copy of the object identified by the GUID.

In general, in one aspect, the invention relates to a computer readable medium for storing a first copy of an object comprising software instructions to obtain the object comprising a globally unique identifier (GUID), generate a first derived GUID using the GUID of the object, store the first copy of the object identified by the first derived GUID in a root node of the object, publish possession of the first copy of the object identified by the first derived GUID by the root node of the object, associate a first shadow root with the first copy of the object, and store the first copy of the object identified by the GUID in the first shadow root.

Other aspects of the invention will be apparent from the following description and the appended claims.

DETAILED DESCRIPTION

Exemplary embodiments of the invention will be described with reference to the accompanying drawings. Like elements in the various figures are denoted by like reference numerals for consistency. Further, the use of "ST" in the drawings is equivalent to the use of "Step" in the detailed description below.

In the following detailed description of the invention, numerous specific details are set forth in order to provide a more thorough understanding of the invention. In other instances, well-known features have not been described in detail to avoid obscuring the invention.

In general, embodiments of the invention relate to a distributed object storage system. Specifically, embodiments of the invention relate to a system for replicating and storing multiple copies of objects in a distributed object store. More specifically, embodiments of the invention relate to using replicated copies of objects to retrieve object data in a partitioned distributed object storage system.

Figure 1:
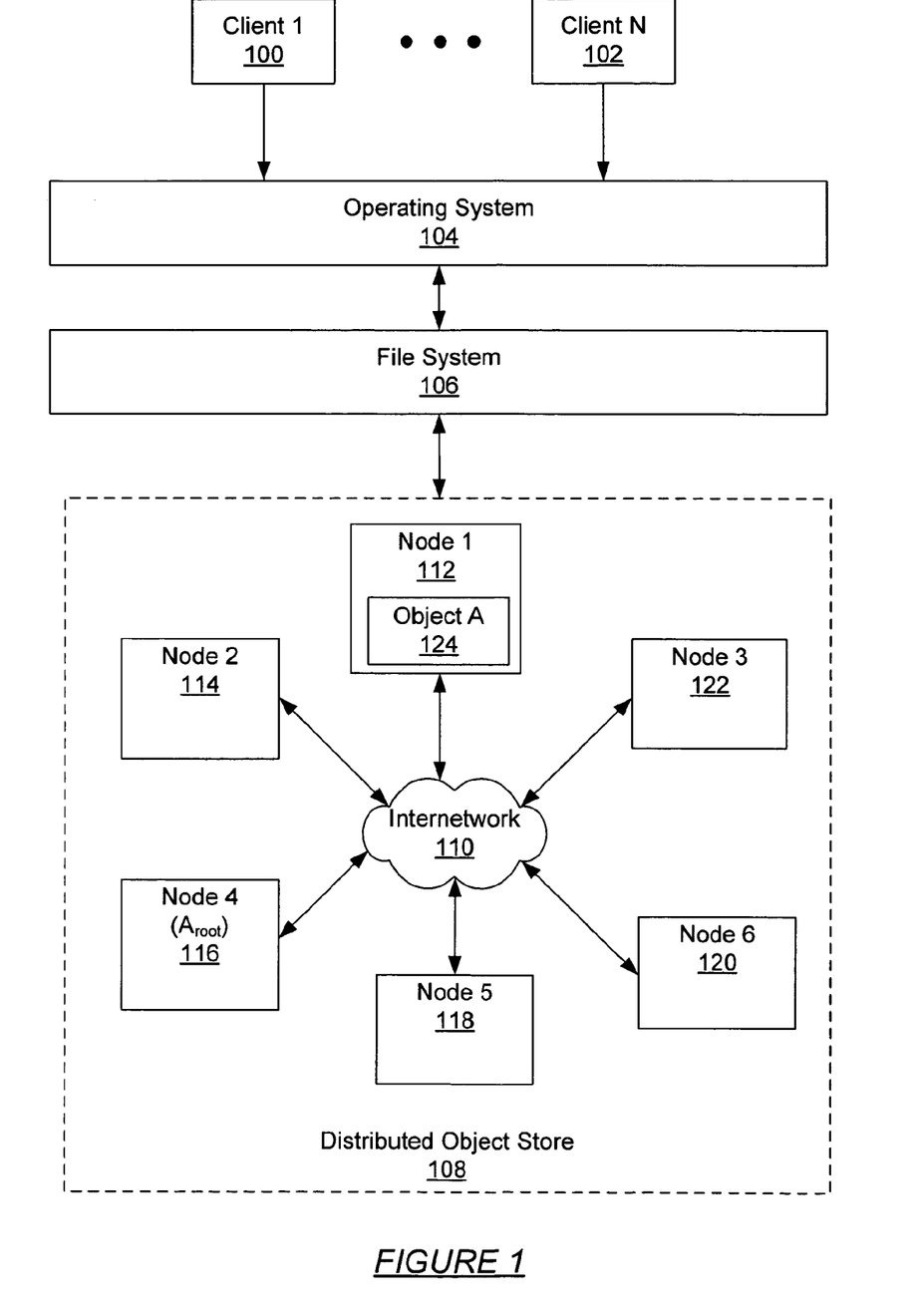
FIG. 1 shows a system in accordance with one embodiment of the invention.

FIG. 1 shows a system in accordance with one embodiment of the invention. The system includes one or more clients (i.e., Client 1 (100), Client N (102)) operatively connected to an operating system (104). The operating system (104) in turn is operatively connected to a file system (106), which is operatively connected to a distributed object store (DOS) (108). The operating system (104) typically provides clients (100, 102) with interfaces for opening, closing, editing, etc., files stored in the file system (106). The files, stored in the file system (106), contain data that is stored in the form of objects in the DOS (108). In one embodiment of the invention, an object is a collection of data that is capable of being modified and read by clients (e.g., Client 1 (100), Client N (102)) (described in FIG. 2 below).

In one embodiment of the invention, the file system (106) includes functionality to resolve file names associated with the file system (106) to object identifiers (i.e., globally unique identifiers (GUIDs)) associated with the DOS (108). In one embodiment of the invention, every element (nodes, objects, etc.) within the DOS (108) is identified using a GUID. In one embodiment of the invention, the GUID is a location independent handle that is used to reference elements of the DOS (108). In one embodiment of the invention, all GUIDs for elements within the DOS (108) are obtained from the same namespace. In one embodiment of the invention, the GUID may be assigned using a hash of the public key corresponding to the entity for which a GUID is being assigned, or by combining the hash of the public key of the entity with the hash of an arbitrary string (i.e., filename) of the object. GUIDs are communicated by the file system (106) to the DOS (108) via an interface to the DOS (108).

GUIDs communicated to the DOS (108) are subsequently used to call lower-level interfaces that retrieve objects corresponding to the GUID. In this manner, a client's (i.e., Client 1 (100), Client N (102)) request (including a file name) may be serviced by the DOS (108) using a GUID to locate and provide access to an object containing the data requested by the client (i.e., Client 1 (100), Client N (102)). In one embodiment of the invention, the interface between the file system (106) and the DOS (108) allows simple commands to be communicated, such as retrieving a file, storing a file, deleting a file, etc.

In one embodiment of the invention, the DOS (108) is a mutable object store (i.e., the DOS (108) includes read and write capabilities) that includes multiple nodes (i.e., Node 1 (112), Node 2 (114), Node 3 (122), Node 4 (116), Node 5 (118), Node 6 (120)), where each node (e.g., Node 1 (112), Node 2 (114), Node 3 (122), Node 4 (116), Node 5 (118), Node 6 (120)) may include local storage capacity. All the nodes (i.e., Node 1 (112), Node 2 (114), Node 3 (122), Node 4 (116), Node 5 (118), Node 6 (120)) in the DOS (108) communicate using an internetwork (110). In one embodiment of the invention, the internetwork (110) of the DOS (108) is organized using distributed hash tables (DHT). DHT provides the information look up service for the DOS (108). Specifically, DHT provides the use of horizontally partitioned hash tables, where each partition of the hash tables is replicated on multiples nodes within the DOS (108). Thus, communication and routing of messages, objects, update requests, etc. from clients to nodes and nodes to nodes within the DOS (108) is handled using DHT.

Further, some nodes (e.g., Node 1 (112), Node 2 (114), Node 3 (122), Node 4 (116), Node 5 (118), Node 6 (120)) within the DOS (108) may be used for object storage, message passing, management, etc. In one embodiment of the invention, an object is a collection of data that is stored in the DOS (108) using a GUID. More generally, every element (nodes, objects, etc.) within the DOS (108) is identified using a GUID. Further, each node in the DOS (108) is capable of locating and retrieving objects via their respective GUIDs. FIG. 1 shows object A (124), where the GUID of object A (124) is denoted as $A_{obj}$ (not shown).

In one embodiment of the invention, if a node in the DOS (108) possesses an object, then the node publishes the possession of the object over the internetwork (110). In one embodiment of the invention, publishing an object involves advertising the content of an object to the root node of the object (described below). For example, if a particular node stores an object (i.e., ensures that some published content associated with an object is not lost and is stored somewhere in the DOS), then that node may publish possession of the object. In one embodiment of the invention, each node in the DOS (108) includes functionality for a self-regulating publish rate. The self-regulating publish rate specifies how often an object is published. Alternatively, one node in the DOS (108) may request another node to publish an object. Further, in one embodiment of the invention, a number of object attributes may be included in the message publishing an object (i.e., the message sent over the internetwork (110)), such as, the level of importance of the data in the object, the name of the object, the expiry date of the object, the required redundancy of the object, and other attributes that may be relevant to the object. In one embodiment of the invention, if a particular attribute is included in the publish message of an object, e.g., an attribute indicating the object is important (i.e., the data contained in the object is critical), then a chain of events is triggered that automatically replicates the object on multiple nodes (i.e., shadow roots) within the DOS (108) (described in FIG. 2 below). Those skilled in the art will appreciate that the object may be replicated for reasons other than importance of the object.

Continuing with FIG. 1, in one embodiment of the invention, for any object in the DOS (108) a root node associated with the object exists. The root node of the object is responsible for knowing the location of the object at all times. In one embodiment of the invention, the location of an object is determined by knowing the GUIDs of the nodes in the DOS that store and/or publish the object. Thus, the root node of an object is responsible for knowing the GUIDs of the nodes that store and/or publish the object. FIG. 1 shows the root node of object A (124) as Node 4 (116), where Node 4 (116) is denoted as $A_{root}$ (i.e., the root of object A (124)) for purposes of illustration. Thus, Node 4 (116) is responsible for locating object A (124). In one embodiment of the invention, if the root node of an object fails, is disconnected from the internetwork (110), or is otherwise unable to function, another node within the DOS (108) automatically becomes the root node for the object. A new root node for the object is assigned based on the GUID of the object. Specifically, in one embodiment of the invention, the root node that has a GUID that is closest to (i.e., the nearest lower GUID in the namespace from which GUIDs are obtained) the GUID of the object is assigned as the root node of the object. For example, if an object's GUID is 1000, then a node with a GUID in closest proximity to 1000, for example 900, is assigned the root node of the object, provided no other node has a GUID between 901 and 999. Thus, if the root node of an object fails or is somehow disconnected from the internetwork (110), a new node that has a lower GUID that is closest to the GUID of the object is assigned as the root node of the object. In one embodiment of the invention, assigning a root node for an object is done implicitly via the DOS network. More specifically, when a root node for an object is no longer active, a new root node automatically receives the next publishing message associated with the object.

Figure 2:
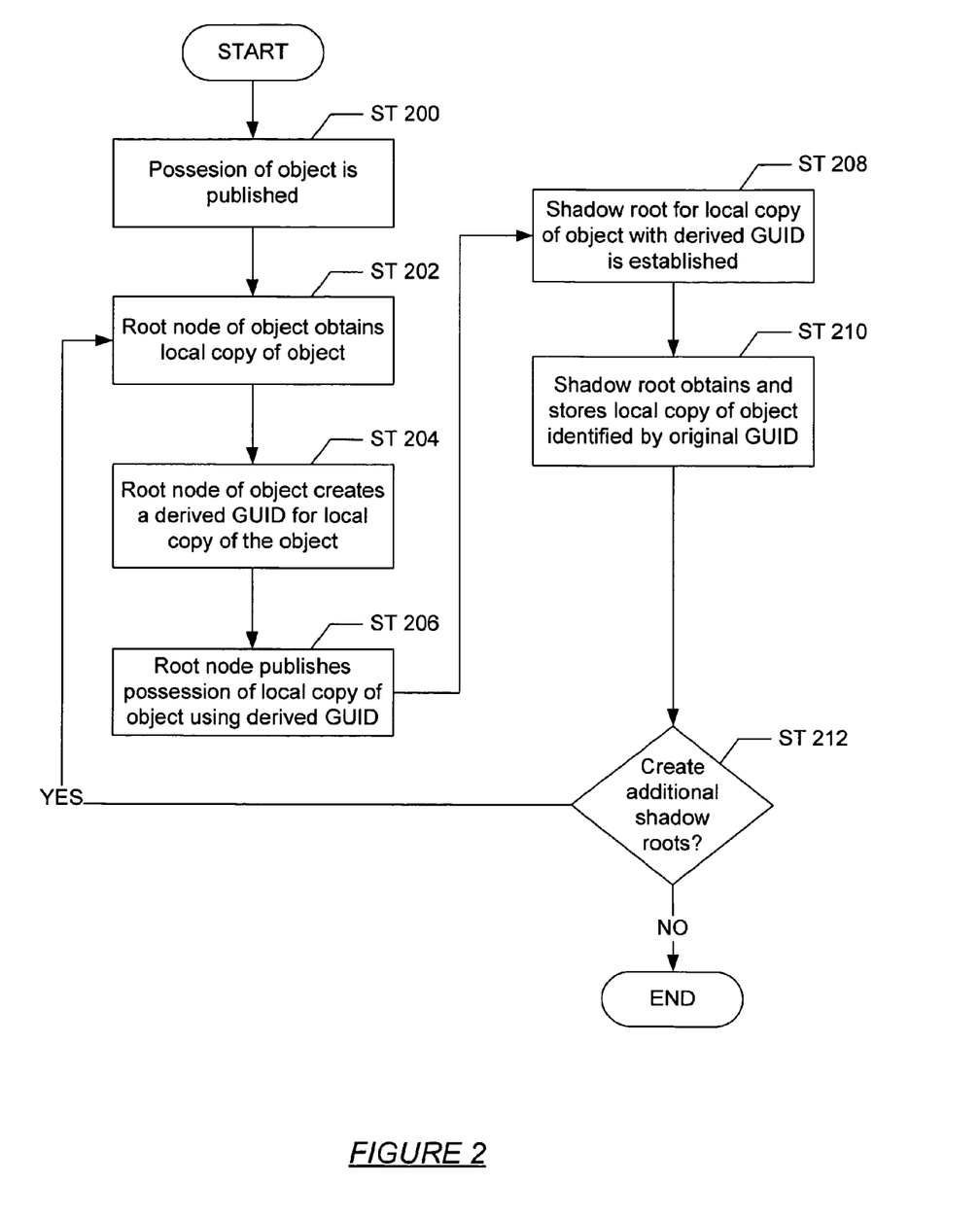
FIG. 2 shows a flow chart for creating a shadow root in accordance with one embodiment of the invention.

FIG. 2 shows a flow chart for creating shadow roots in a DOS in accordance with one embodiment of the invention. Initially, the storer of an object (i.e., a node possessing the object) publishes possession of the object (Step 200). Alternatively, in one embodiment of the invention, an element within the DOS may request that a particular node publish possession of an object. In one embodiment of the invention, when the node (i.e., the publisher) publishes possession of the object, the message used to publish possession of the object by the node indicates that the object (i.e., the data contained in the object) is important. Eventually, the publishing message is received at the root node of the object. As noted above, each object in the DOS has a corresponding root node that is responsible for tracking the location of the object in the DOS. Because the object is flagged as important, the root node of the object subsequently obtains a local copy of the object (Step 202). Once a local copy of the object is obtained, the root node proceeds to generate/derive a GUID to associate with the local copy of the object (Step 204). In one embodiment of the invention, the derived GUID is obtained by applying a hash function to the original GUID of the object. At this stage, the root node contains a local copy of the object identified by the derived GUID. In one embodiment of the invention, the local copy of the object identified by the derived GUID is simply an identical copy of the original object that is identified by a different name. Thus, the content of the local copy of the object identified by the derived GUID is identical to the content of the original object.

Those skilled in the art will appreciate that any type of mapping may be used to associate the original GUID of an object to a derived GUID. For example, a function may be one that numerically adds 1 to the GUID, etc. In one embodiment of the invention, the root node of an object also keeps a back pointer to the node storing the object.

Continuing with the discussion of FIG. 2, the root node subsequently publishes possession of the local copy of the object identified by the derived GUID (Step 206). The publishing of the possession of the local copy of the object identified by the derived GUID results in obtaining a root node (i.e., a shadow root) for the local copy of the object identified by the derived GUID (Step 208). As described above, a root node for an object is automatically assigned based on the GUID of the object. In one embodiment of the invention, the root node that receives the publishing message is known as a shadow root because the node is a root node of a shadow object (i.e., a copy of an object identified by a derived GUID).

Subsequently, the shadow root obtains and stores a local copy of the original object identified by the original GUID (Step 210). In one embodiment of the invention, the shadow root obtains a local copy of the original object under the original GUID. In one embodiment of the invention, the shadow root may obtain the original GUID of the object from the root node of the original object (identified by the original GUID) or by reversing the function applied to obtain the derived GUID of the object (if the function is reversible). In one embodiment of the invention, the shadow root stores the local copy of the original object identified by the original GUID. The shadow root subsequently publishes possession of the original object identified by the original GUID. At this point, the message indicating the possession of the original object is received by the root of the original object. Thus, the root of the original object is now aware of three copies of the original object—one in the node that initially published the original object, one in the original root node itself, and one in the shadow root.

At this stage, the root node of the original object determines whether to create additional shadow roots (Step 212). If the root node of the original object determines that enough copies of the original object exist, then the process ends. Alternatively, if the root node determines that additional copies of the original object need to be stored, then Steps 202-214 are repeated until enough copies exist. Those skilled in the art will appreciate that additional shadow roots may be created in parallel.

In one embodiment of the invention, if the root node determines that multiple shadow roots for a given object are required, then root node may create several derived GUIDs based on the original GUID of the object in order to stimulate the creation of several shadow roots, where each shadow root is the root node for some derived GUID of the original object. Those skilled in the art will appreciate that each new derived GUID may be obtained by applying a mapping function to the original GUID, applying a mapping function to a particular derived GUID of the object, applying a reversible function, etc. In one embodiment of the invention, the number of shadow roots to create for a given object may be tracked using a counter included, for example, in the root node of the object. As shadow roots are created, the counter is decremented.

Those skilled in the art will appreciate that the maximum number of copies set by the counter may vary depending on the relative importance of the object. Thus, if an object is of high importance, more copies of the object may be stored in the DOS.

In one embodiment of the invention, the root node of an object includes functionality to check on the existence of shadow roots associated with the object. More specifically, the root node may from time to time (e.g., once a day, twice a day, etc.) check on each of the shadow roots so that when some or a majority of the shadow roots cannot be reached because of the partitioning of the DOS or individual failures, the root node may initiate the process for allocating new nodes as shadow roots. Those skilled in the art will appreciate that checking the existence of shadow roots occurs implicitly via the DOS architecture. For example, if the shadow roots each publish the object identified by the original GUID, then the original root node may note that no re-publish has taken place for a particular object, and thus the original root node may re-publish the object. Alternatively, the process may be implemented by having the original root node re-publish the GUIDs of each of the shadow roots. If the shadow roots already hold the re-published GUIDs, then the shadow roots exist. However, if the shadow roots do not possess each of the shadow root GUIDs, shadow roots become newly elected and acquire the content of the original object.

In one embodiment of the invention, the mapping function applied to obtain derived GUIDs of an object is highly random, resulting in dissimilar GUIDs each time a derived GUID is obtained. This, in turn, leads to the various shadow roots being topologically disparate from each other because a shadow root is assigned based on the node that has the closest GUID to the derived GUID that the shadow root is associated with. Thus, those skilled in the art will appreciate that shadow roots are created in anticipation of partitions occurring in the DOS. Because the DOS may partition in such a way that the root node of an object may not be located in the same partition as a node requesting access to the object, the creation of topologically disparate shadow roots that keep local copies of the object increases the chances of finding a shadow root for a particular object in a partition.

Those skilled in the art will appreciate that while the aforementioned method may create shadow roots that are associated with the root node via a star topology, the above method may be easily modified to support additional topologies such as a ring topology, etc.

Figure 3:
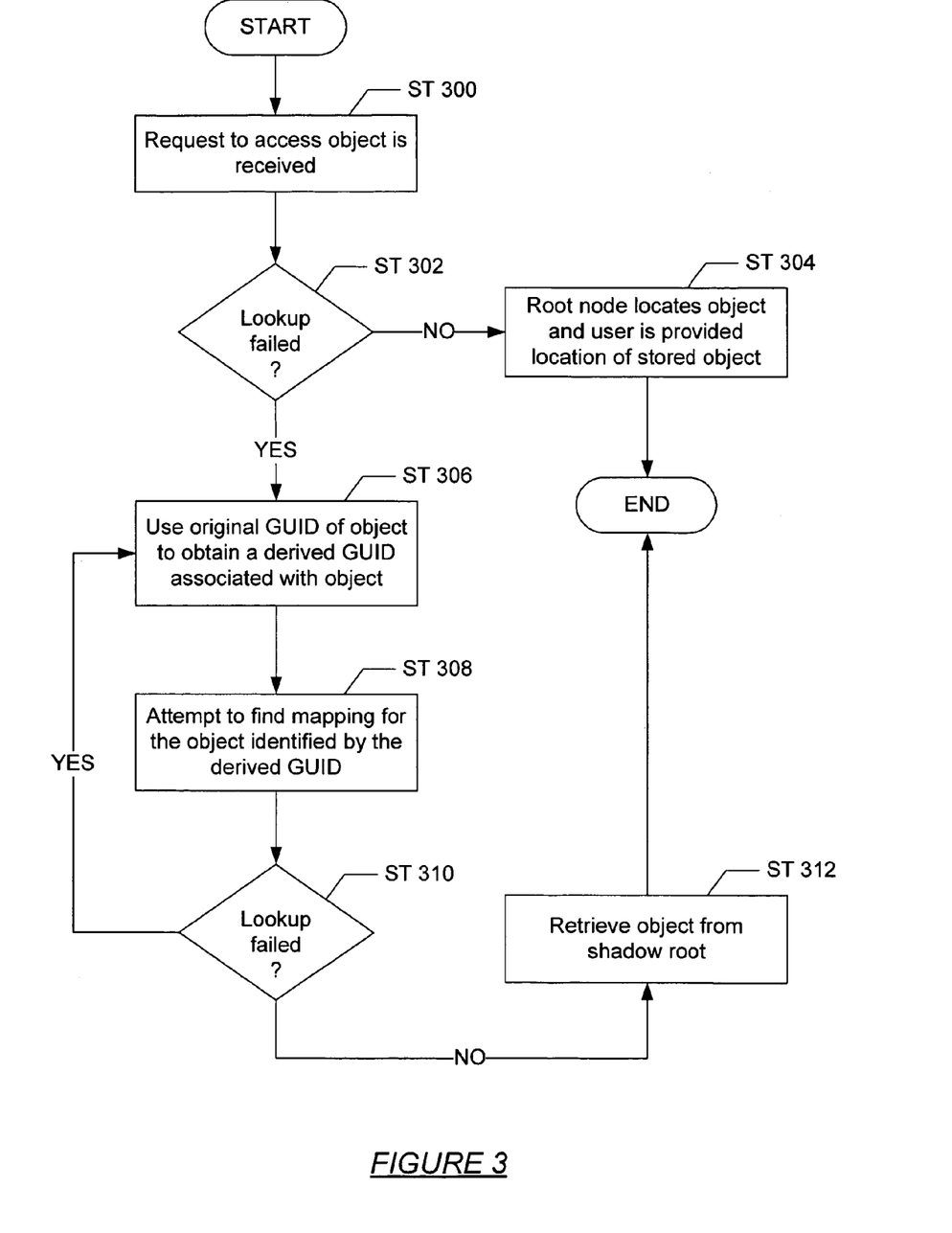
FIG. 3 shows a flow chart for using shadow roots in accordance with one embodiment of the invention.

FIG. 3 shows a flow chart for using shadow roots in accordance with one embodiment of the invention. More specifically, FIG. 3 illustrates the use of shadow roots in a partitioned DOS. Initially, a node in the DOS requests access to an object identified by its original GUID (Step 300). In one embodiment of the invention, the object is an important object that contains critical data. As described above, the request to access the object is received at the root node of the object, because the root node of an object is responsible for knowing the location of the object at all times. If the root node that exists in the partition is capable of servicing the request (Step 302), then the root node locates the object and the requesting node is provided the location of the stored object (Step 304). Those skilled in the art will appreciate that the root node may locate the object anywhere in the DOS, including in previously established shadow roots associated with the object.

Alternatively, although a new root node is appointed for the object in a partitioned DOS, the new root node may not know the location of the object, or may not have acquired the necessary information associated with the object (Step 302). In this case, in one embodiment of the invention, the node requesting access to the object may receive a message indicating that the object identified by the original GUID cannot be found in the partition. If the object identified by its original GUID cannot be found in the partition, the node requesting access to the object uses the original GUID of the object to obtain a derived GUID (Step 306), and associate the derived GUID with the original object. As mentioned above, the derived GUID may be obtained by applying a mapping function to the original GUID of the object. The mapping function may be, for example, a hash function.

Next, the node requesting access to the object attempts to find a mapping for the object with the derived GUID (i.e., uses the derived GUID to locate a copy of the original object stored in the partition) (Step 308). In one embodiment of the invention, if a shadow root identified by the derived GUID exists in the partition (Step 310), then the object is retrieved from the shadow root, i.e., the requesting node is provided the location of the original object by the shadow root (Step 312). As discussed above, the shadow root stores a copy of the original object, identified by the original GUID. Alternatively, if a mapping under the derived GUID is not found in the partition, then the requesting node repeats Steps 306-308 in order to obtain and search for a copy of the object identified by a second derived GUID. Once a mapping for at least one derived GUID is found, the requesting node proceeds to access the original object via the shadow root of the object identified by the particular derived GUID that was used to search for a mapping of the original object.

In one embodiment of the invention, when the requesting node is provided the location of the original object, the shadow roots include functionality to initiate the creation of additional shadow roots for the partition. In one embodiment of the invention, the shadow roots may initiate the reconstruction process by publishing a message indicating possession of the object, and indicating the importance of the object. The message is received at the new root node of the object (i.e., the root node that is appointed in the partition based on the GUID of the object), and the new root node obtains a derived GUID used to identify a copy of the object, stores a copy of the object identified by the derived GUID, and initiates the creation of one or more shadow roots as described above in FIG. 2. In this manner, additional shadow roots may be created in a partition that lost some or all of the shadow roots that existed prior to the partitioning of the DOS.

Figure 4A:
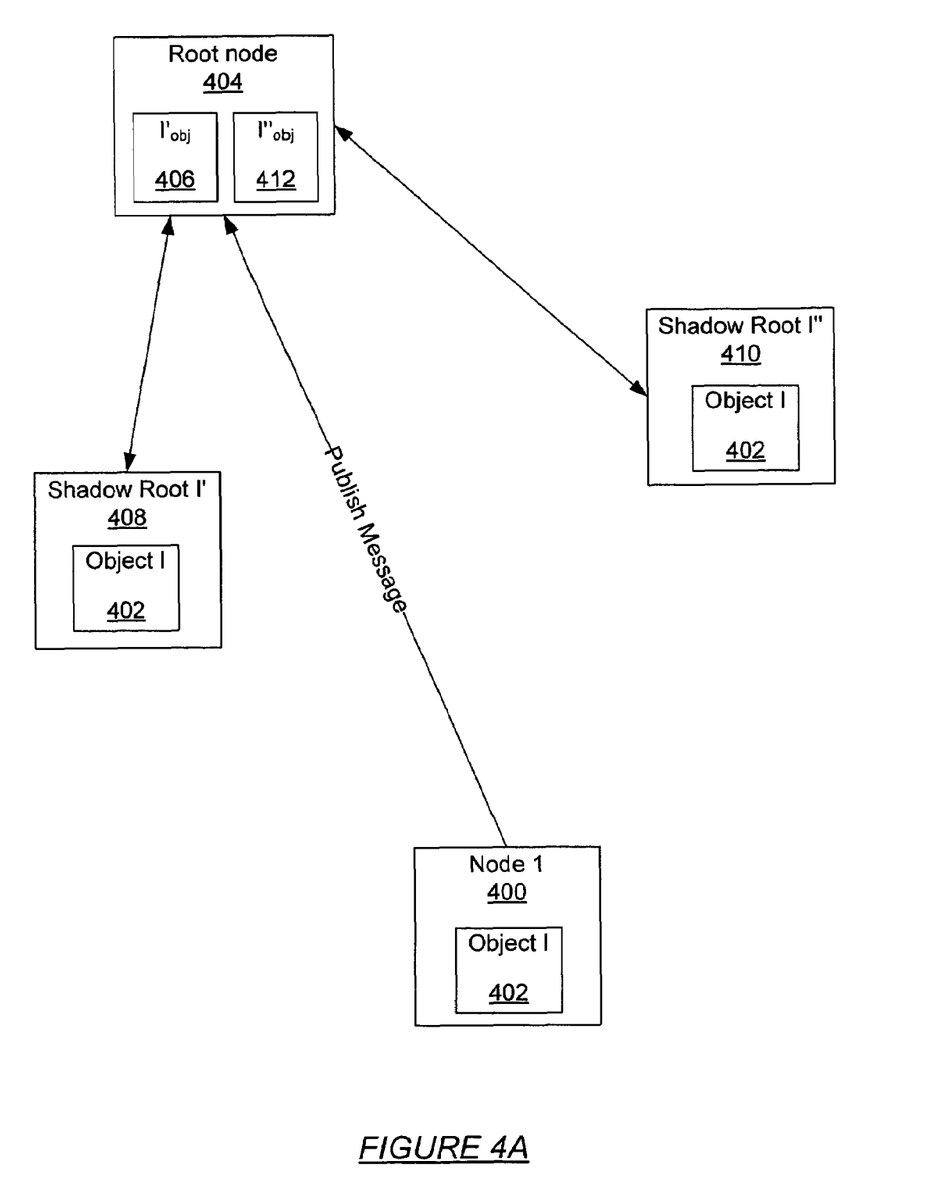
FIGS. 4A and 4B show examples of shadow roots in accordance with one embodiment of the invention.
Figure 4B:
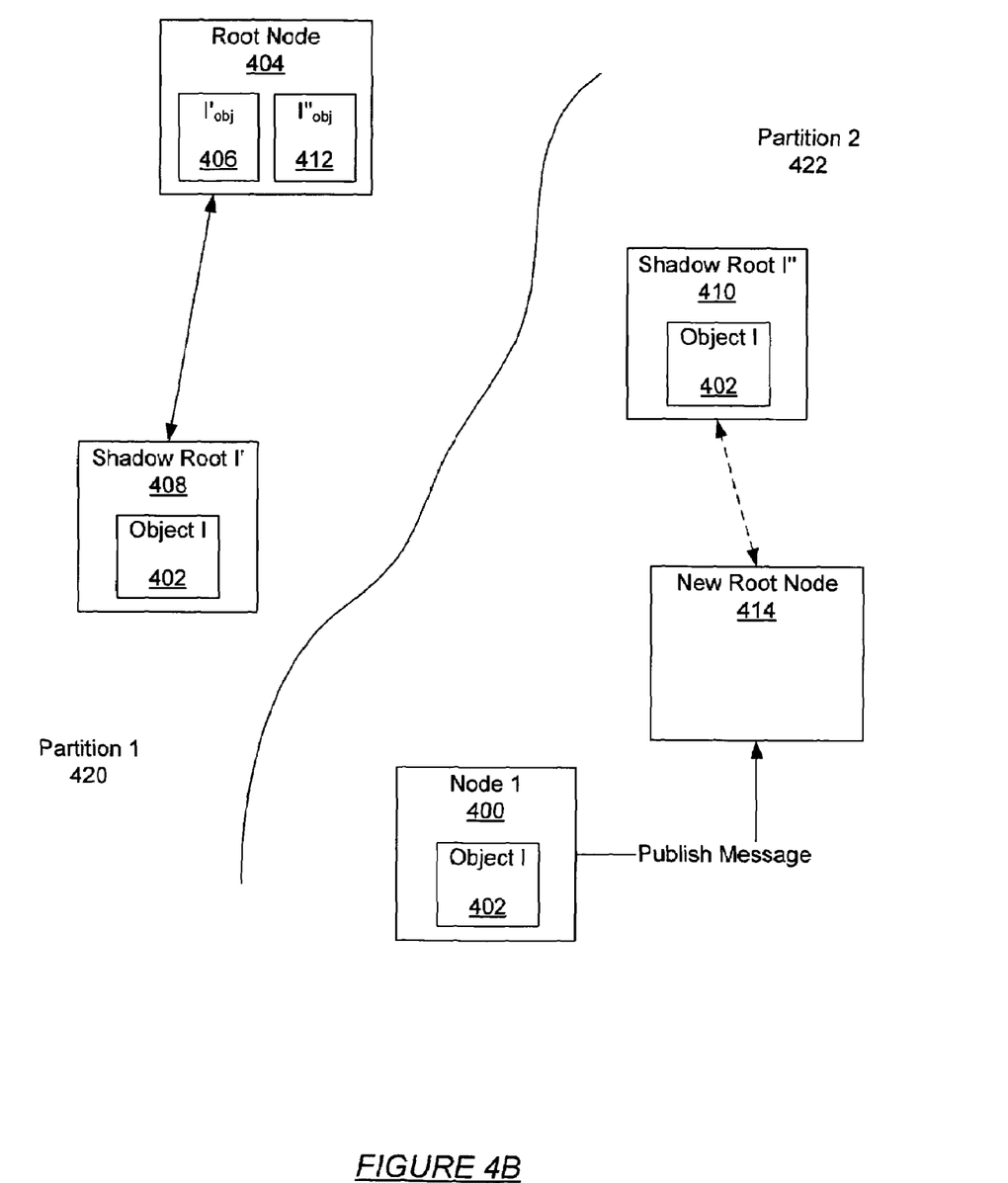

FIGS. 4A and 4B show examples of creating and using shadow roots in accordance with one embodiment of the invention. Specifically, FIG. 4A shows the creation of multiple shadow roots in a united DOS, and FIG. 4B shows the use of shadow roots in a partitioned DOS. FIG. 4A shows a node (Node 1 (400)) possessing object I (402), where object I (402) is identified by GUID $I_{obj}$ (not shown), a root node (404) for object I (402), and two shadow roots (Shadow Root I' (408) and Shadow Root I" (410)) created using $I_{obj}$. Those skilled in the art will appreciate that for the purposes of discussion, object I (402) may be referenced by the GUID $I_{obj}$. Initially, Node 1 (400) publishes possession of object I (402) indicating that object I (402) is important. The publishing message is received at the root node (404) of object I (402) and signals the root node (404) to begin a chain of events to initiate the creation of shadow roots for object I (402).

Initially, the root node (404) obtains a local copy of object I (406) and associates the local copy of object I (406) with a derived GUID, denoted as $I'_{obj}$. As discussed above, $I'_{obj}$ may be obtained by applying a hash to $I_{obj}$. The root node (404) then publishes the possession of the local copy of object I (402) identified by $I'_{obj}$ (406). Shadow Root I' (408) subsequently becomes the root node of the local copy of object I (402) identified by $I'_{obj}$ (406). Shadow Root I' (408) then proceeds to obtain and store object I (402) identified by $I_{obj}$. In one embodiment of the invention, obtaining object I (402) identified by its original GUID may include reversing the function applied to obtain the derived GUID $I'_{obj}$ (406), or a simple look-up of the original GUID of object I (402). At this stage, Shadow Root I' (408) possesses a copy of object I (402) identified by $I_{obj}$. Shadow Root I' (408) subsequently publishes the possession of the original object I (402). The root node (404) of object I (402) identified by its original GUID subsequently receives the publish message from Shadow Root I' (408). By receiving the publish message from Shadow Root I' (408), the root node (404) is now aware Shadow Root I' (408) possess a local copy of object I (402) identified by $I_{obj}$.

In this example, the root node (404) then initiates the creation of an additional shadow root. To create an additional shadow root, the root node (404) obtains another local copy of object I (402) and associates the local copy of object I (402) with a second derived GUID, denoted by $I''_{obj}$ (412). As before, the root node (404) publishes the possession of the local copy of object I (402) identified by $I''_{obj}$ (412). Shadow Root I" (410) subsequently becomes the root node of the local copy of object I (402) identified by $I''_{obj}$ (412). Shadow Root I" (410) then obtains and stores object I (402), where object I (402) is identified by its original GUID $I_{obj}$. Shadow Root I" (410) subsequently publishes possession of the copy of the original object I (402) identified by $I_{obj}$. Because the GUID of the copy of object I is $I_{obj}$, the root node of the copy of object I (402) stored in the Shadow Root I" (410) is root node (404).

Those skilled in the art will appreciate that the root node (404) may not keep a copy of object I (402) for each derived GUID that object I is identified by. Rather, in one embodiment of the invention, reference numerals 406 and 412 may be pointers to the locations of the copies of object I (402) under each derived GUID. In this manner, if there are many copies of object I under many different derived GUIDs, the root node (404) need not use storage space to keep multiple local copies of object I (402) identified by each derived GUID. The root node (404) includes functionality to remember or calculate the derived GUIDs under which object I (402) is published to the shadow roots.

FIG. 4B illustrates a partitioned DOS in which the shadow roots created in FIG. 4A are split such that one shadow root exists in each partition, and a node requests access to an object in a partition that does not initially include a root node for the requested object. For purposes of illustration, the DOS is shown as partitioned into two individual partitions, Partition 1 (420) and Partition 2 (422). Those skilled in the art will appreciate that the DOS may partition into several partitions. As shown, Node 1 initially requests access to object I (402), identified by the GUID $I_{obj}$, by sending a message that should be received by the root node of object I (402). However, in this example, the DOS has partitioned, leaving the original root node (404) of object I (402) in Partition 1 (420). Thus, the DOS automatically assigns a new root node for object I (402) (i.e., New Root Node (414)) in Partition 2 (422)) based on the node that possesses the closest lower GUID (i.e., closest and lower in namespace) to the GUID of object I (402).

However, the new root node (414) does not know where to locate object I (402). Thus, when the new root node receives the publishing message from Node 1 (400), the new root node (414) may not be capable of locating object I (402) on behalf of Node 1 (400). At this stage, Node 1 (400) obtains a derived GUID for object I (402) by applying a mapping function to $I_{obj}$ (402) (i.e., the GUID of object I (402)). Suppose for purpose of this example that the derived GUID obtained by Node 1 (400) is $I'_{obj}$ (406). Subsequently, Node 1 (400) sends out another message searching for a copy of object I (402) identified by I'$_{obj}$ (406). If a shadow root exists that is associated with I'$_{obj}$ (i.e., a shadow root that is the root node for the object identified by I'$_{obj}$), then the shadow root includes functionality to locate a copy of object I (402) and provide the contents of object I (402) to the requesting node (i.e., Node 1 (400)). However, in this example, Partition 2 (422) does not contain a shadow root that is associated with I'$_{obj}$ (406). In this case, Node 1 (400) may receive a message indicating that a copy of object I (402) identified by I'$_{obj}$ (406) was not found in Partition 2 (422).

Subsequently, Node 1 (400) attempts to locate another copy of object I (402) identified by a second derived GUID, denoted as I"$_{obj}$ (412). Suppose further that the second attempt to locate object I (402) identified by I"$_{obj}$ finds Shadow Root I" (410) in Partition 2 (422). Because a shadow root associated with I"$_{obj}$ (412) exists in Partition 2 (422), Shadow Root I" (410) provides Node 1 (400) with the contents of object I (402). In one embodiment of the invention, Shadow Root I" (410) may provide Node 1 (400) with the contents of object I (402) from the local copy of object I (402) that Shadow Root I" (410) stores. Alternatively, Shadow Root I" (410) may locate object I (402) identified by I"$_{obj}$ (412) and provide the contents of the located object I (402) to Node 1 (400). Once Node 1 (400) obtains the contents of object I (402), one of the shadow roots may initiate the creation of additional shadow roots associated with object I (402) by publishing possession of object I (402) under the original GUID and indicating the importance of object I (402). Similarly, the root node (404) of object I (402) in Partition 1 (420) may initiate the creation of additional shadow roots within Partition 1 (420).

Those skilled in the art will appreciate that the new root node (414) of object I (402) may also search for shadow roots in the same manner as shown with respect to Node 1 (400). Specifically, a new root node that is newly assigned in a partition may obtain the contents of the object that the root node is responsible for by first obtaining the original GUID of the object and then seeking the location of a shadow root associated with a copy of the object identified by a derived GUID and acquiring the contents of the original object from the shadow root. The new root node cannot do this on its own, however, because the new root node, when appointed, does not know that an object is a shadow object. Further, those skilled in the art will appreciate that when a partitioned DOS reunites, superfluous shadow roots are disabled, and only the necessary amount of shadow roots (i.e., that may be given by the aforementioned counter) remain in the reunited DOS. In one embodiment of the invention superfluous shadow roots are disabled such that the root node functionality of each of the superfluous shadow roots is taken over by one node closer to the GUID of the object. The disabled shadow root then notices that the shadow root has lost one of its shadow root objects, and thus locally erases the object (and stops publishing the object).

Figure 5:
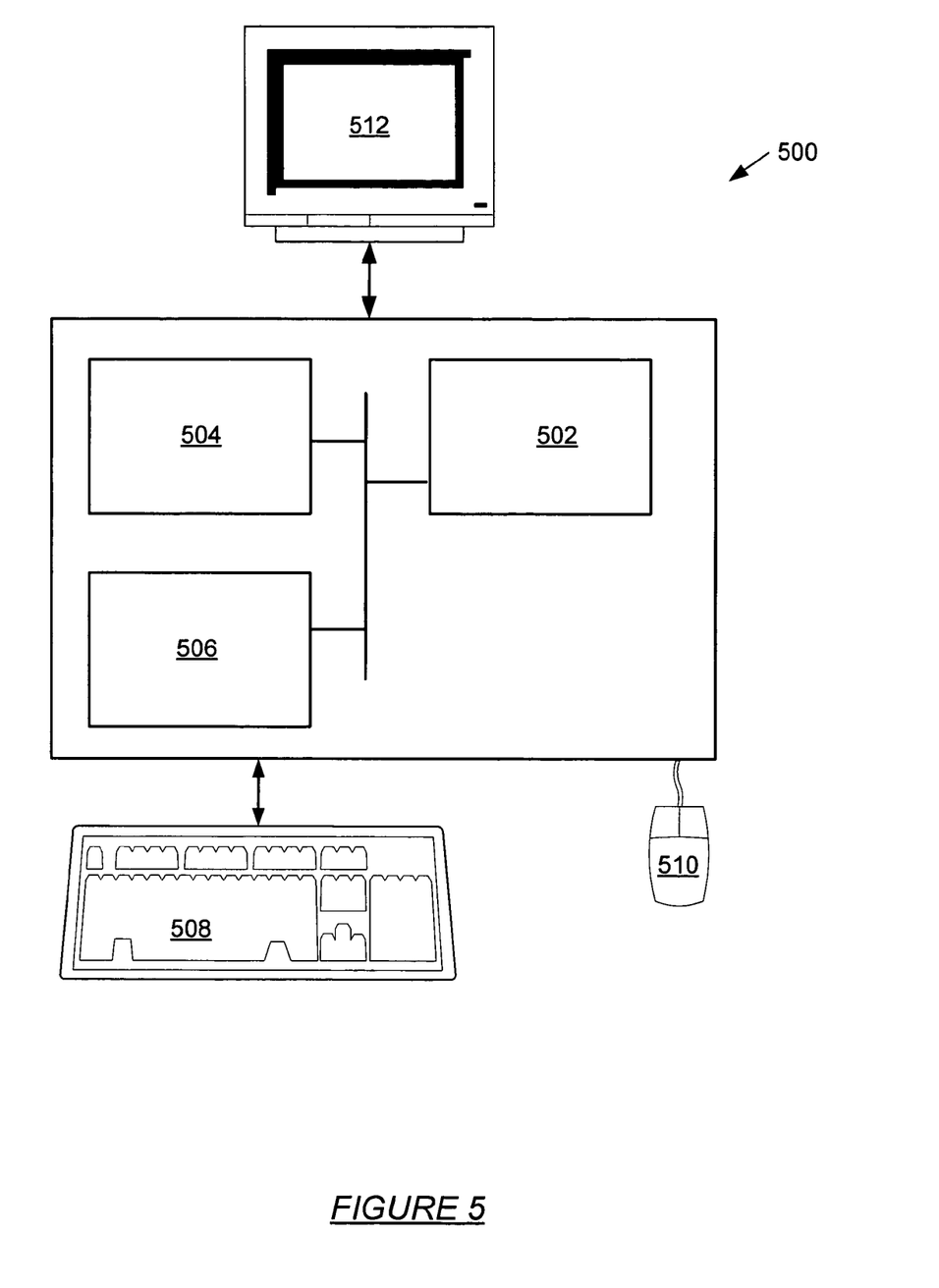
FIG. 5 shows a computer system in accordance with one embodiment of the invention.

An embodiment of the invention may be implemented on virtually any type of computer regardless of the platform being used. For example, as shown in FIG. 5, a networked computer system (500) includes a processor (502), associated memory (504), a storage device (506), and numerous other elements and functionalities typical of today's computers (not shown). The networked computer (500) may also include input means, such as a keyboard (508) and a mouse (510), and output means, such as a monitor (512). The networked computer system (500) is connected to a local area network (LAN) or a wide area network via a network interface connection (not shown). Those skilled in the art will appreciate that these input and output means may take other forms. Further, those skilled in the art will appreciate that one or more elements of the aforementioned computer (500) may be located at a remote location and connected to the other elements over a network. Further, software instructions to perform embodiments of the invention may be stored on a computer readable medium such as a compact disc (CD), a diskette, a tape, a file, or any other computer readable storage device.

Embodiments of the invention provide a method for automatically generating copies of important objects using the local behavior of the DOS. Specifically, embodiments of the invention allow shadow roots to keep local copies of important objects so that when the distributed object store partitions, at least one copy of the important object may be found in each partition.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for storing copies of an object, comprising:
obtaining the object comprising a globally unique identifier (GUID);
generating a first derived GUID by applying a hash function to the GUID of the object;
assigning a root node to the object based on the GUID, wherein the root node is included in a distributed object store (DOS);
storing a first copy of the object in the root node, wherein the first copy of the object is identified by the first derived GUID;
publishing possession of the first copy of the object by the root node of the object;
associating a first shadow root with the first copy of the object based on the first derived GUID, wherein the first shadow root is included in the DOS;
storing a second copy of the object in the first shadow root, wherein the second copy of the object is identified by the GUID;
decrementing a counter wherein the counter comprises a number of shadow roots to store copies of the object;
generating a second derived GUID using the first derived GUID;
storing a third copy of the object in the root node of the object, wherein the third copy of the object is identified by the second derived GUID;
publishing possession of the third copy of the object by the root node of the object;
associating a second shadow root with the third copy of the object based on the second derived GUID, wherein the second shadow root is included in the DOS; and
storing a fourth copy of the object in the second shadow root, wherein the fourth copy of the object is identified by the GUID.

2. The method of claim 1, further comprising:
publishing possession of the second copy of the object by the first shadow root, wherein publishing possession of the second copy of the object comprises sending a message indicating that the second copy of the object is important.

3. The method of claim 1, further comprising:
obtaining the GUID using the first derived GUID by the first shadow root.

4. The method of claim 3, wherein obtaining the GUID using the first derived GUID comprises one selected from the group consisting of looking-up the GUID used to obtain the first derived GUID and reversing a function applied to obtain the first derived GUID.

5. The method of claim 1, wherein generating the second derived GUID comprises applying a mapping function to the first derived GUID.

6. The method of claim 1, wherein the first shadow root and the second shadow root are topologically disparate.

7. The method of claim 1, wherein the first shadow root and the second shadow root form at least one network topology from the group consisting of a ring topology, a daisy chain topology, and a star topology.

8. The method of claim 1, wherein if one of the first shadow root and the second shadow root fails, then a new shadow root is created automatically by the root node of the object.

9. The method of claim 1, further comprising:
obtaining the GUID using the second derived GUID by the second shadow root.

10. The method of claim 9, wherein obtaining the GUID using the second derived GUID comprises one selected from the group consisting of looking-up the GUID used to obtain the second derived GUID and reversing a function applied to obtain the second derived GUID.

11. The method of claim 1, wherein generating the first derived GUID comprises applying a mapping function to the GUID.

12. The method of claim 1, further comprising:
sending a first request for the object using the GUID by a client; and
if the object is not found using the GUID:
generating the first derived GUID using the GUID by the client;
sending a second request for the object identified by the first derived GUID; and
servicing the second request by the first shadow root, wherein the first shadow root provides the client with the object using the first derived GUID.

13. The method of claim 12, further comprising:
locating the object.

14. A system, comprising:
a processor;
a memory operatively connected to the processor;
a node resident in the memory and configured to publish possession of an object, wherein the object comprises a globally unique identifier (GUID);
a root node resident in the memory, wherein the root node is associated with the object based on the GUID, and wherein the root node is configured to:
generate a first derived GUID by applying a hash function to the GUID;
store a first copy of the object, wherein the first copy is identified by the first derived GUID; and publish a message indicating possession of the first copy of the object using the first derived GUID;
a first shadow root resident in the memory, wherein the first shadow root is configured to store a second copy of the object upon receiving the message, wherein the second copy is identified by the GUID;
decrementing a counter wherein the counter comprises a number of shadow roots to store copies of the object;
generating a second derived GUID using the first derived GUID;
storing a third copy of the object in the root node of the object, wherein the third copy of the object is identified by the second derived GUID;
publishing possession of the third copy of the object by the root node of the object;
associating a second shadow root with the third copy of the object based on the second derived GUID, wherein the second shadow root is included in the DOS; and
storing a fourth copy of the object in the second shadow root wherein the fourth copy of the object is identified by the GUID.

15. The system of claim 14, wherein the message also indicates that the object is important.

16. The system of claim 14, wherein generating the first derived GUID comprises applying a mapping function to the GUID.

17. The system of claim 14, wherein the first shadow root is further configured to:
obtain the second copy of the object from the root node; and
obtain the GUID using the first derived GUID.

18. The system of claim 17, wherein obtaining the GUID using the first derived GUID comprises one selected from the group consisting of looking-up the GUID used to obtain the second derived GUID and reversing a function applied to obtain the second derived GUID.

19. The system of claim 14, wherein the root node is further configured to:
generate a second derived GUID using the first derived GUID;
store a third copy of the object, wherein the third copy of the object is identified by the second derived GUID; and
publish possession of the third copy of the object using the second derived GUID.

20. The system of claim 19, wherein generating the second derived GUID comprises applying a mapping function to the first derived GUID.

21. The system of claim 19, further comprising:
a second shadow root configured to store the third copy of the object identified by the GUID.

22. The system of claim 14, further comprising:
a client configured to send a first request to access the object using the GUID.

23. The system of claim 22, wherein the client is further configured to send a second request to access the object using the first derived GUID if the root node of the object does not respond to the first request.

24. The system of claim 23, wherein the first shadow root responds to the second request by locating the object.

25. A computer readable medium for storing a copy of an object comprising software instructions to:
obtain the object comprising a globally unique identifier (GUID);
generate a derived GUID by applying a hash function to the GUID of the object;
store the copy of the object in a root node of the object, wherein the copy of the object is identified by the derived GUID, wherein the root node is included in a distributed object store (DOS);
publish possession of the copy of the object by the root node of the object;
associate a shadow root with the copy of the object based on the derived GUID, wherein the shadow root is included in the DOS;
store a second copy of the object in the shadow root, wherein the second copy of the object is identified by the GUID;
decrementing a counter, wherein the counter comprises a number of shadow roots to store copies of the object;

generating a second derived GUID using the first derived GUID;

storing a third copy of the object in the root node of the object wherein the third copy of the object is identified by the second derived GUID;

publishing possession of the third copy of the object by the root node of the object;

associating a second shadow root with the third copy of the object based on the second derived GUID, wherein the second shadow root is included in the DOS; and storing a fourth copy of the object in the second shadow root wherein the fourth copy of the object is identified by the GUID.

* * * * *